Nov. 26, 1957 L. L. BURNS, JR 2,814,785

ELECTROMECHANICAL FILTER

Filed July 29, 1955

INVENTOR.
LESLIE L. BURNS, JR.
BY
Charles H. Brown
ATTORNEY

United States Patent Office 2,814,785
Patented Nov. 26, 1957

2,814,785

ELECTROMECHANICAL FILTER

Leslie L. Burns, Jr., Princeton, N. J., assignor to Radio Corporation of America, a corporation of Delaware Application July 29, 1955, Serial No. 525,211

12 Claims. (Cl. 333—72)

The invention relates to electromechanical filters, and particularly to electromechanical filters designed for use in the audio frequency range.

An object of the invention is to provide an improved bandpass electromechanical filter for use in the audio frequency range.

Another object is to provide an improved and physically compact electromechanical filter that operates in the audio frequency range.

These objects are accomplished in accordance with the invention by an electromechanical filter having a plurality of resonator elements that are mechanically coupled together to form a series of the resonator elements, each resonator element consisting of a flat plate of material designated to operate in a bending mode. An input resonator is mechanically coupled to the first resonator element of the series and an output resonator is mechanically coupled to the last resonator element of the series. Means for exciting the bending mode of vibration in the resonator elements are mechanically coupled to the input resonator, and means for detecting the bending mode of vibration in the resonator elements are mechanically coupled to the output resonator.

The invention is explained in detail in connection with the accompanying drawing, in which.

Figure 1:
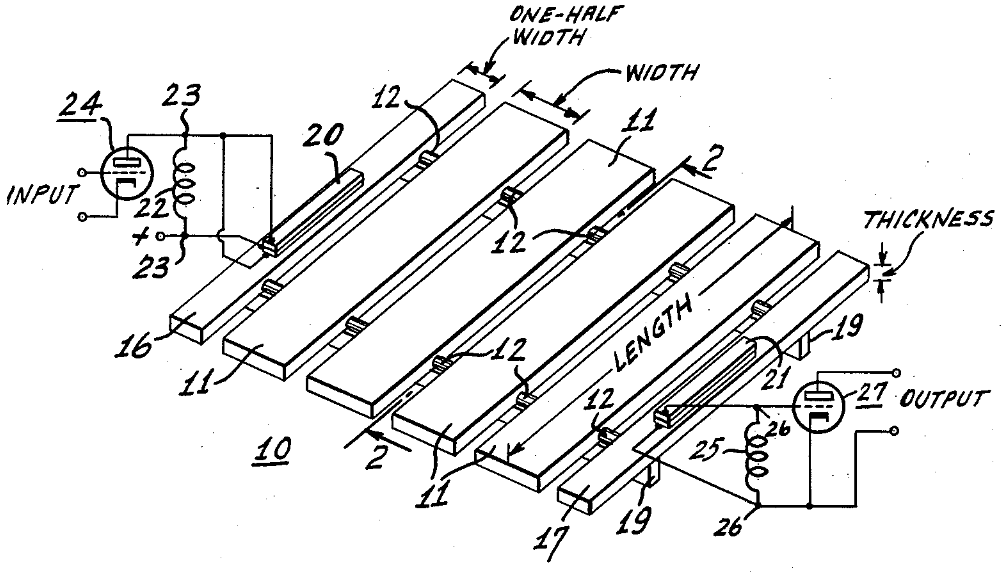
Figure 1 shows a perspective view of one embodiment of the invention.

In Figure 1, a perspective view of a five section electromechanical filter 10 is shown. The electromechanical filter 10 comprises four resonator elements 11, although more or less resonator elements 11 may be used, depending upon the degree of selectivity desired. The resonator elements 11 are similar to each other and are made from a flat plate of some material having a sufficiently high Q. A metal, for example steel, is preferred. Each of the resonator elements 11 has a predetermined length, width, and thickness as indicated in Figure 1, in accordance with the following relation:

$$\omega = a_n\sqrt{\frac{EI}{\mu L^4}}$$

In the above relation, a $\omega = 2\pi f$, where $f$ is the fundamental resonant bending frequency of the resonator elements 11, $a_n$ is a constant depending upon the mode of bending employed, E is Young's modulus for the particular material being used, I is the moment of inertia of the resonator elements 11, $\mu$ is the mass per unit length of the resonator elements 11, and L is the length as indicated in Figure 1. The above relation and values for $a_n$ are given at page 431 of "Mechanical Vibrations," by Hartog, second edition, third impression, 1940, published by McGraw-Hill.

From the above relation, the resonator elements 11 are designed for the desired frequency $f$. The resonator elements 11 operate in the bending or free-free mode (i. e. both ends are free to vibrate) about nodes that are transverse to the plane surfaces or edges formed by their lengths and thicknesses. Consequently, the resonator elements are positioned with the large surfaces formed by their respective lengths and widths in the same plane, and with their lengths parallel with each other and with their ends aligned. The resonator elements 11 are coupled together at their nodes by coupling necks 12 made of some metallic material, such as steel, to form a series of the resonator elements 11. The coupling necks 12 may be of any shape, but cylindrical necks are preferred. The number of nodes depends upon the frequency at which the resonator elements 11 operate in the bending mode. The coupling necks 12 operate in torsion and are positioned so that their longitudinal axes are substantially coincident with the nodes. The only requirement for the coupling necks 12 is that they be short in comparison to their torsional wavelength at the operating frequency of the electromechanical filter 10. This is easily accomplished by making coupling necks 12 that have a length less than the length of the resonator elements 11. The amount of coupling provided by the coupling necks 12 varies inversely with their length and directly with their area. Each of the resonator elements 11 shown in Figure 1 has two nodes, each of which is coupled to the nodes of adjacent resonator elements 11 by coupling necks 12.

Figure 2:
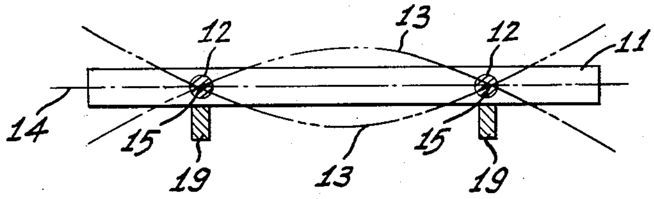
Figure 2 shows a sectional view taken along the line 2—2 in Figure 1.

Figure 2 shows a sectional view of the electromechanical filter 10 taken along the line 2—2 in Figure 1. In Figure 2, the dashed lines 13 represent (in an exaggerated manner) the maximum limits of motion about a normal axis 14 of the resonator elements 11 when operating in the bending mode about the two nodal points 15.

An input resonator 16 and an output resonator 17, each preferably made of the same material as the resonator elements 11, and each having the same length and thickness as the resonator elements 11, are coupled to the first and last resonator elements 11 respectively of the series. The input and output resonators 16, 17 are positioned with the large surfaces formed by their respective lengths and widths in the same plane as the large surfaces of the resonator elements 11, with their lengths parallel with the lengths of the resonator elements 11, and with their ends aligned with the ends of the resonator elements 11. The input and output resonators 16, 17 also operate in the bending mode about nodes that are transverse to the surfaces formed by their lengths and thicknesses. Consequently, the input and output resonator elements 16, 17 are coupled to the first and last resonator elements 11 respectively by the coupling necks 12 located at the nodes as described in connection with the resonator elements 11. In other words, one edge of the input resonator 16 formed by its length and thickness is coupled to the outer edge of the first resonator element 11, and one edge of the output resonator 17 formed by its length and thickness is coupled to the outer edge of the last resonator element 11. In order to obtain a filter characteristic that has a smooth passband, the input and output resonators 16, 17 must be half sections in accordance with conventional filter theory. The required half sections are obtained by making the input and output resonators 16, 17 half as wide as the resonator elements 11. Input and output resonators 16, 17 of smaller width do not affect the frequency of the electromechanical filter 10, as is evident from the relation given previously.

The assembled electromechanical filter 10 may be held in any desired position by suitable supports 19 fastened to the resonator elements 11 and the input and output resonators 16, 17 at or near the nodes. Means for exciting and detecting the bending mode in the electromechanical filter 10 can be any suitable transducer device. In an experimental electromechanical filter constructed in accordance with the invention, the exciting means was electromagnetic in the form of an ordinary earphone with the cover and diaphragm removed. The earphone was placed beneath the input resonator but not in contact therewith, with the permanent magnet of the earphone supplying the magnetic bias. In the same experimental electromechanical filter, the detecting means was piezoelectric in the form of an ordinary crystal phonograph pickup. The pickup was placed on the output resonator to detect the bending of the output resonator.

Figure 1 shows a preferred exciting means 20 and detecting means 21. Both the exciting and detecting means 20, 21 comprise a Bimorph, which is the trade name for a flexing-type piezoelectric element developed by the Brush Electronics Company. This element comprises two transverse-expander plates cemented together face to face in such a manner that voltages applied to electrodes fastened to the plates cause the plates to deform in opposite directions, resulting in a bending action. Conversely, mechanical bending of the element causes it to develop a voltage between the electrodes. Such a piezoelectric element may be connected in parallel (i. e. connecting the two electrodes fastened to the outer surfaces of the plates to one terminal of the element and connecting the electrode fastened to the inner surfaces of both plates to the other terminal of the element) or in series (i. e. connecting one electrode fastened to the outer surface of one plate to one terminal of the element and connecting one electrode fastened to the outer surface of the other plate to the other terminal of the element). Elements connected in parallel are used in electrically driven applications because of the higher sensitivity resulting from the application of full voltage to each plate. For that reason, the preferred exciting means 20 shown in Figure 1 comprise a parallel-connected Bimorph cemented on the large surface of the input resonator 16 in the area of maximum vibration. Bending of the exciting means 20 causes the input resonator 16 to operate in the bending mode. Elements connected in series are used in mechanically driven applications because the voltages produced in the two plates are added together. For that reason, the preferred detecting means 21 shown in Figure 1 comprise a series-connected Bimorph cemented on the large surface of the output resonator 17 in the area of maximum vibration. Bending of the output resonator 17 causes the detecting means 21 to bend also and produce an output voltage. An input coil 22 is connected between the terminals 23 of the exciting means 20 and is of such a value as to be parallel resonant with the inherent capacity of the exciting means 20 at the midband frequency of the electromechanical filter 10. The input coil 22 may be connected to the output circuit of a vacuum tube 24 as shown. An output coil 25 is connected between the terminals 26 of the detecting means 21 and is of such a value as to be parallel resonant with the inherent capacity of the detecting means 21 at the midband frequency of the electromechanical filter 10. A vacuum tube 27 may be connected to the output coil 25 as shown.

Mechanical damping in addition to that supplied by the exciting and detecting means 20, 21 is generally required to terminate the electromechanical filter 10 properly. This damping may be supplied by coating the input and output resonators 16, 17 with a plastic material such as neoprene to which powdered tungsten has been added when the neoprene was in a molten state, or by attaching a small container of loose material such as sand to each of the resonator elements 11.

A five section electromechanical filter such as shown in Figure 1 was constructed of elements having the following specifications:

Resonator elements 11:
- Material—steel
- Length—6.16 inches
- Width—1.00 inch
- Thickness—0.1875 inch Input and output resonators 16, 17:
- Material—steel
- Length—6.16 inches
- Width—0.50 inch
- Thickness—0.1875 inch Coupling necks 12, 18:
- Material—steel
- Length—0.125 inch
- Diameter—0.125 inch The coupling necks were mounted at the nodes by brazing, each node being located 1.375 inches in from the ends of the resonator elements and the input and output resonators. A strip of polystyrene 0.1875 inch thick, 0.25 inch wide, and 6.16 inches long was cemented to the outer surfaces or edges formed by the length and thickness of the input and output resonators to serve as terminations for the electromechanical filter. This electromechanical filter had a flat response and a sharp passband between 1,011 cycles and 1,164 cycles, and provided an extremely compact electromechanical filter for such low audio frequencies. The passband of the electromechanical filter is determined by the amount of coupling between the resonator elements and the input and output resonators, which in turn varies directly with the number of coupling necks between adjacent resonator elements and between the input and output resonators and adjacent resonator elements. The amount of coupling also varies with the length and area of the coupling necks. With coupling necks at the two nodes and having the dimensions given above, a passband of 153 cycles was obtained.

The electromechanical filter described has many applications, particularly in the audio frequency range. Such applications include: Telegraph reception in radio receivers, telegraph carrier systems, telemetering system, and audio frequency spectrum analyzers.

The invention claimed is:

1. An electromechanical filter, comprising at least one resonator element consisting of a flat plate of material, an input resonator consisting of a flat plate of material mechanically coupled to one edge of said resonator element, an output resonator consisting of a flat plate of material mechanically coupled to the opposite edge of said resonator element, means coupled to said input resonator for exciting a bending mode of vibration therein about nodes that are transverse to a plane surface formed by the length and thickness of said input resonator, and means coupled to said output resonator for detecting a bending mode of vibration therein about said nodes.

2. An electromechanical filter, comprising a plurality of resonator elements each consisting of a flat plate of metallic material, means mechanically coupling said resonator elements in series to form a chain of said resonator elements coupled together at nodes that are transverse to a plane surface formed by the length and thickness of said resonator elements, an input resonator comprising a flat plate of metallic material mechanically coupled to said nodes to one end resonator element of said chain, means coupled to said input resonator for exciting a bending mode of vibration therein about said nodes, an output resonator comprising a flat plate of metallic material mechanically coupled at said nodes to the other end resonator element of said chain, and means coupled to said output resonator for detecting a bending mode of vibration therein about said nodes.

3. An electromechanical filter, comprising at least one resonator element comprising a relatively thin generally rectangular plate of metallic material having a predetermined length, width, and thickness, an input resonator and an output resonator each comprising a relatively thin generally rectangular plate of metallic material and having said predetermined length and thickness and a width less than said predetermined width, means for mechanically coupling one edge of said input resonator formed by its length and thickness to one edge of said resonator element formed by its length and thickness, means for mechanically coupling one edge of said output resonator formed by its length and thickness to the opposite edge of said resonator element, means coupled to said input resonator for exciting a bending mode of vibration therein about nodes that are transverse to said edges, and means coupled to said output resonator for detecting a bending mode of vibration therein about said nodes.

4. An electromechanical filter, comprising at least one resonator element comprising a relatively thin generally rectangular plate of material having a predetermined length, width, and thickness, an input resonator comprising a relatively thin generally rectangular plate of material and having said predetermined length and thickness and a width less than said predetermined width, means coupled to said input resonator for exciting a bending mode of vibration therein about nodes that are transverse to the edges of said input resonator that are formed by its length and thickness, means mechanically coupling one edge of said input resonator formed by its length and thickness to one edge of said resonator element formed by its length and thickness for coupling said bending mode of vibration to said resonator element, an output resonator comprising a relatively thin generally rectangular plate of material and having said predetermined length and thickness and a width less than said predetermined width, means mechanically coupling one edge of said output resonator formed by its length and thickness to the opposite edge of said resonator element for coupling said bending mode of vibration to said output resonator, and means coupled to said output resonator for detecting said bending mode of vibration therein about said nodes.

5. An electromechanical filter, comprising a plurality of resonator elements each comprising a thin substantially rectangular plate of material having a predetermined length, width, and thickness, means mechanically coupling said resonator elements together at the edges formed by their lengths and thicknesses to form a series chain of said resonator elements coupled together at nodes that are transverse to said edges, an input resonator comprising a thin substantially rectangular plate of said material and having said predetermined length and thickness and a width less than said predetermined width, means mechanically coupling one edge of said input resonator formed by its length and thickness to the outer edge of one end resonator element of said chain at said nodes, an output resonator comprising a thin substantially rectangular plate of said material and having the same predetermined length, width, and thickness as said input resonator, means mechanically coupling one edge of said output resonator formed by its length and thickness to the outer edge of the other end resonator element of said chain at said nodes, means coupled to said input resonator for exciting a bending mode of vibration therein about said nodes, and means coupled to said output resonator for detecting a bending mode of vibration therein about said nodes.

6. An electromechanical filter, comprising a plurality of resonator elements each comprising a relatively thin generally rectangular plate of metallic material having a predetermined length, width, and thickness, cylindrical coupling necks mechanically coupled between adjacent resonator elements at nodes that are transverse to the edges formed by their respective lengths and thicknesses to form a series of said resonator elements, an input resonator and an output resonator each comprising a relatively thin generally rectangular plate of said material and having said predetermined length and thickness and half of said predetermined width, cylindrical coupling necks mechanically coupled between said input resonator and the first resonator element in said series at nodes that are transverse to the edges formed by their respective lengths, and thicknesses, cylindrical coupling necks mechanically coupled between said output resonator and the last resonator element in said series at nodes that are transverse to the edges formed by their respective lengths and thicknesses, means coupled to said input resonator for exciting a bending mode of vibration therein about said nodes, and means coupled to said output resonator for detecting a bending mode of vibration therein about said nodes.

7. An electromechanical filter, comprising a plurality of resonator elements each comprising a relatively thin generally rectangular plate of metallic material, each of said plates being designed to operate in a bending mode and having a predetermined length, width, and thickness, metallic coupling necks mechanically coupled between adjacent resonator elements at nodes on the edges formed by their respective lengths and thicknesses when operating in said bending mode to form a series of said resonator elements, an input resonator and an output resonator each comprising a relatively thin generally rectangular plate of metallic material and having said predetermined length and thickness and half of said predetermined width, metallic coupling necks mechanically coupled between said input resonator and the first resonator element in said series at nodes on the edges formed by their respective lengths and thicknesses when operating in said bending mode, metallic coupling necks mechanically coupled between the last resonator element in said series and said output resonator at nodes on the edges formed by their respective lengths and thicknesses when operating in said bending mode, means coupled to said input resonator for exciting said bending mode of vibration therein about said nodes, and means coupled to said output resonator for detecting said bending mode of vibration therein about said nodes.

8. An electromechanical filter, comprising a plurality of resonator elements each comprising a relatively thin generally rectangular plate of metallic material having a predetermined length, width, and thickness, each of said plates being designed to operate in a bending mode about nodes that are transverse to the edges formed by said lengths and thicknesses, coupling necks comprising cylinders of said material mechanically coupled between said edges of adjacent resonator elements at said nodes to form a series of said resonator elements, an input resonator and an output resonator each comprising a relatively thin generally rectangular plate of said material and having said predetermined length and thickness and half of said predetermined width, said input and said output resonators each being designed to operate in said bending mode about nodes that are transverse to the edges formed by said lengths and thicknesses, coupling necks comprising cylinders of said material mechanically coupled between one of said edges of said input resonator and the outer edge of the first resonator element in said series at said nodes, coupling necks comprising cylinders of said material mechanically coupled between one of said edges of said output resonator and the outer edge of the last resonator element in said series at said nodes, means coupled to said input resonator for exciting said bending mode of vibration therein about said nodes, and means coupled to said output resonator for detecting said bending mode of vibration therein about said nodes.

9. An electromechanical filter, comprising a plurality of resonator elements each comprising a relatively thin generally rectangular plate of metallic material having a predetermined length, width, and thickness, each of said plates being designed to operate in a bending mode about nodes that are transverse to the edges formed by said lengths and thicknesses, cylindrical coupling necks of said material mechanically coupled between said edges of adjacent resonator elements at said nodes to form a series of said resonator elements, an input resonator and an output resonator each comprising a relatively thin generally rectangular plate of said material and having said predetermined length and thickness and half of said predetermined width, said input and said output resonators each being designed to operate in said bending mode about nodes that are transverse to the edges formed by said lengths and thicknesses, spaced coupling necks of said material mechanically coupled between one of said edges of said input resonator and the outer edge of the first resonator element in said series at said nodes, cylindrical coupling necks of said material mechanically coupled between one of said edges of said output resonator and the outer edge of the last resonator element in said series at said nodes, a transducer coupled to said input resonator for exciting said bending mode of vibration therein about said nodes, and a transducer coupled to said output resonator for detecting a bending mode of vibration therein about said nodes.

10. An electromechanical filter, comprising a plurality of resonator elements each comprising a relatively thin generally rectangular plate of metallic material having a predetermined length, width, and thickness, each of said plates being designed to operate in a bending mode about nodes that are transverse to the edges formed by said lengths and thicknesses and that are symmetrically positioned about the center of said plates, coupling necks of said material mechanically coupled between said edges of adjacent resonator elements at said nodes to form a series of said resonator elements, an input resonator and an output resonator each comprising a relatively thin generally rectangular plate of said material and having said predetermined length and thickness and half of said predetermined width, said input and said output resonators each being designed to operate in said bending mode about nodes that are transverse to the edges formed by said lengths and thicknesses, coupling necks of said material mechanically coupled between one of said edges of said input resonator and the outer edge of the first resonator element in said series at said nodes, coupling necks of said material mechanically coupled between one of said edges of said output resonator and the outer edge of the last resonator element in said series at said nodes, a piezoelectric transducer coupled to said input resonator for exciting said bending mode of vibration therein about said nodes, and a piezoelectric transducer coupled to said output resonator for detecting said bending mode of vibration therein about said nodes.

11. An electromechanical filter, comprising at least one resonator element comprising a relatively thin generally rectangular plate of metallic material having a predetermined length, width, and thickness, an input resonator and an output resonator each comprising a relatively thin generally rectangular plate of metallic material and having said predetermined length and thickness and a width less than said predetermined width, means for mechanically coupling one edge of said input resonator formed by its length and thickness to one edge of said resonator element formed by its length and thickness, means for mechanically coupling one edge of said output resonator formed by its length and thickness to the opposite edge of said resonator element, means coupled to said input resonator for exciting a bending mode of vibration therein about nodes transverse to said edges, and means coupled to said output resonator for detecting said bending mode of vibration therein about said nodes, said means for mechanically coupling said resonators together comprising rods of metallic material positioned at said nodes, and having lengths which are short in comparison to their torsional wavelength at the operating frequency of said filter.

12. An electromechanical filter, comprising a plurality of resonator elements each comprising a relatively thin generally rectangular plate of metallic material, each of said plates being designed to operate in a bending mode and having a predetermined length, width, and thickness, metallic coupling necks mechanically coupled between adjacent resonator elements at nodes on the edges formed by their respective lengths and thicknesses when operating in said bending mode to form a series of said resonator elements, said nodes being symmetrically disposed along said length and on opposite sides of the center thereof, an input resonator and an output resonator each comprising a relatively thin generally rectangular plate of metallic material and having said predetermined length and thickness and one half of said predetermined width, metallic coupling necks mechanically coupled between said input resonator and the first resonator element in said series at said nodes on the edges formed by their respective lengths and thicknesses when operating in said bending mode, metallic coupling necks mechanically coupled between the last resonator element in said series and said output resonator at said nodes on the edges formed by their respective lengths and thicknesses when operating in said bending mode, means coupled to said input resonator for exciting said bending mode of vibration therein about said nodes, and means coupled to said output resonator for detecting said bending mode of vibration therein about said nodes.

References Cited in the file of this patent

UNITED STATES PATENTS

| | | |
|---|---|---|
| 2,443,471 | Mason | June 15, 1948 |
| 2,501,488 | Adler | Mar. 21, 1950 |

OTHER REFERENCES

Doelz et al.: Electronics, vol. 26, No. 3, March 1953, pages 138–142.